United States Patent
Speight et al.

(10) Patent No.: US 11,095,713 B2
(45) Date of Patent: Aug. 17, 2021

(54) EDGE COMPUTING SYSTEM

(71) Applicant: Veea Systems Ltd., Bath (GB)

(72) Inventors: Timothy James Speight, Monmouthshire (GB); Nicholas Jelbert, Bath (GB); Stephen Robert Calvert, Bath (GB)

(73) Assignee: Veea Systems Ltd., Bath (GB)

( * ) Notice: Subject to any disclaimer, the term of this patent is extended or adjusted under 35 U.S.C. 154(b) by 335 days.

(21) Appl. No.: 15/838,644

(22) Filed: Dec. 12, 2017

(65) Prior Publication Data

US 2018/0167445 A1    Jun. 14, 2018

(30) Foreign Application Priority Data

Dec. 12, 2016 (GB) ..................... 1621068

(51) Int. Cl.
*H04L 29/08* (2006.01)
*G06F 9/50* (2006.01)
*H04L 12/26* (2006.01)

(52) U.S. Cl.
CPC .......... *H04L 67/101* (2013.01); *G06F 9/5044* (2013.01); *G06F 9/5072* (2013.01); *G06F 9/5094* (2013.01); *H04L 43/0882* (2013.01); *H04L 67/1012* (2013.01); *H04L 67/34* (2013.01); *H04L 43/16* (2013.01); *Y02D 10/00* (2018.01)

(58) Field of Classification Search
USPC ........................................................ 709/226
See application file for complete search history.

(56) References Cited

U.S. PATENT DOCUMENTS

| 9,635,580 B2 | 4/2017 | Sundaram |
| 2006/0015849 A1 | 1/2006 | Polozoff |

(Continued)

FOREIGN PATENT DOCUMENTS

| CN | 105843685 A | 8/2016 |
| EP | 2 782 318 A1 | 9/2014 |
| EP | 2829984 | 1/2015 |

OTHER PUBLICATIONS

European Patent Application No. 17206464.4-1221/3343363; European Extended Search Report dated Sep. 3, 2018, 13 pages.

(Continued)

*Primary Examiner* — Hermon Asres
(74) *Attorney, Agent, or Firm* — Fitch, Even, Tabin & Flannery LLP

(57) ABSTRACT

An edge computing system comprises: a cloud computing system; an edge processing function; a connection between the edge processing function and the cloud computing system; a backend server within the cloud computing system. An assessment module is configured to receive information about processing goals, and processing capabilities of the backend server and the edge processing function. The assessment module derives a set of possible interfaces and corresponding functionality splits defining a division of processing activity between the backend server and the edge processing function. Based on a received measurement of bandwidth and/or of latency on the connection, the assessment module selects an interface and corresponding functionality split, and downloads them to the edge processing function and the backend server.

15 Claims, 8 Drawing Sheets

(56) References Cited

U.S. PATENT DOCUMENTS

| | | | |
|---|---|---|---|
| 2007/0067440 A1 | 3/2007 | Bhogal et al. | |
| 2008/0201426 A1 | 8/2008 | Darcie | |
| 2011/0179148 A1* | 7/2011 | Siripunkaw | H04L 67/34 709/220 |
| 2011/0185043 A1 | 7/2011 | Zeller | |
| 2011/0320520 A1* | 12/2011 | Jain | G06F 9/5072 709/203 |
| 2013/0254258 A1* | 9/2013 | Agarwalla | H04L 67/34 709/202 |
| 2013/0346465 A1 | 12/2013 | Maltz et al. | |
| 2014/0095894 A1 | 4/2014 | Barton | |
| 2014/0115128 A1* | 4/2014 | Myrberg | G06F 9/5061 709/221 |
| 2014/0299840 A1 | 10/2014 | Lee | |
| 2014/0317293 A1 | 10/2014 | Shatzkamer | |
| 2016/0370784 A1 | 12/2016 | Gruenewald | |
| 2017/0060574 A1 | 3/2017 | Malladi | |
| 2017/0264525 A1 | 9/2017 | Falk | |
| 2017/0277909 A1 | 9/2017 | Kraemer | |
| 2017/0337070 A1 | 11/2017 | Lee | |

OTHER PUBLICATIONS

European Patent Application No. 17206464.4-1221; European Extended Search Report dated May 9, 2018, 13 pages.

European Patent Application No. 17206468.5-1221; European Extended Search Report dated May 8, 2018, 9 pages.

British Patent Application No. GB1621081.7; Combined Search and Examination Report Under Sections 17 and 18(3); dated Jun. 2, 2017.

Hegyi et al.; Application Orchestration in Mobile Edge Cloud; Placing of IoT Applications to the Edge; 2016 IEEE 1st International Workshops on Foundations and Applications of Self-*Systems; Sep. 12-16, 2016; pp. 230-235; DOI-10.1109/FAS-W.2016.56.

Amento et al.; FocusStack: Orchestrating Edge Clouds Using Location-Based Focus Attention; 2016 IEEE/ACM Symposium on Edge Computing; pp. 179-191; Oct. 27-28, 2016; DOI:10.1109/SEC.2016.22.

Definition of Fog Computing; https://www.openfogconsortium.org/resources/#definition-of-fog-computing; Known as early as Dec. 12, 2016.

Multi-Access Edge Computing; ETSI; http://www.etsi.org/technologies-clusters/technologies/mobile-edge-computing; Known as early as Dec. 12, 2016.

British Patent Application No. GB1621068.4; Combined Search and Examination Report Under Sections 17 and 18(3); dated Jun. 15, 2017.

Definition of Fox Computing; https://www.openfogconsortium.org/resources/#definition-of-fog-computing; Known as early as Dec. 12, 2016.

European Patent Application No. 17 206 464.4-1203; Communicaiton Pursuant to 94(3) EPC; dated Mar. 3, 2020, 8 pages.

European Patent Application No. 17206468.5-1221; Communication Pursuant to 94(3) EPC; dated Jan. 8, 2020, 7 pages.

* cited by examiner

EDGE COMPUTING SYSTEM

RELATED APPLICATION

This application claims the benefit of Great Britain Application No. 1621068.4 filed Dec. 12, 2016. The content of this application is fully incorporated herein in its entirety.

Technical Field

The invention relates to application functions that can be split between cloud and 'edge' computing systems.

BACKGROUND

A recent development in cloud computing is the use of 'fog' or 'edge' computing. 'Fog' or 'edge' computing relies on moving computing and storage functionality out from the cloud and closer to whatever entities or data is to be managed and processed. Such functionality may be applied, for example, to the 'Internet of Things'. 'Internet of Things', IoT, systems often have a wide variety of equipment designs, each of which may have only limited computing power but yet may produce useful data. Such data often originates from widely spaced locations.

Henceforth, the term 'edge' computing will be used in this application to cover computing arrangements that are typically referred to either as 'fog' or 'edge' computing by practitioners. Edge computing is described more fully at: http://www.etsi.org/technologies-clusters/technologies/mobile-edge-computing Fog computing is described more fully at: https://www.openfogconsortium.org/resources/#definition-of-fog-computing FIG. 1 illustrates known cloud computing systems. In FIG. 1A, an example of a known cloud computing architecture 100 is shown in schematic form. A backend server 110 forms part of a cloud computing system 112. Backend server 110 provides a backend processing function, and may for example be an IoT server. Connection 120 links backend server 110 to first sensor device 140, second sensor device 144 and third sensor device 148. Connection 120 serves to provide backhaul connectivity, and is generally a direct connection. In various different versions of cloud computing architecture 100, the connection 120 may be provided by one or more communication technologies, such as cellular, WiFi or Ethernet.

In FIG. 1B, an example of a known Edge computing architecture 160 is shown in schematic form. A backend server 110 forms part of a cloud computing system 112. Connection 120 links backend server 110 to an edge processing function 130. Connection 120 serves to provide backhaul connectivity. Edge processing function 130 provides some of the computing and storage functionality from the cloud computing system 112, such as some of the functionality of the backend server 110 of FIG. 1A. Edge processing function 130 connects to first sensor device 140 via first connection 142, to second sensor device 144 via second connection 146, and third sensor device 148 via third connection 150. First sensor device 140, second sensor device 144 and to third sensor device 148 connect to edge processing function 130, where measurements are initially processed and then results sent to the backend function represented by backend server 110.

In an illustrative example, the edge processing function 130 may be located in the Radio Access Network of a cellular communications system. First connection 142, second connection 146 and third connection 150 are therefore high bandwidth links with very high availability and low latency. Edge processing function 130, when located in the Radio Access Network of a cellular communications system, may support many other remote devices than the first sensor device 140, second sensor device 144 and third sensor device 148 illustrated in FIG. 1B. Although remote from edge processing function 130, those devices may be part of, for example, enterprise computing systems located in customers' premises.

The recognized benefits of the migration to edge computing are as follows: (i) Reduced bandwidth in the backhaul link 120 to the cloud processing functionality in the backend server 110, which reduces the volume of data that needs to be sent back to the cloud computing system 112; (ii) Reduced latency, because the edge processing function 130 can produce results quickly, due to the close proximity of edge processing function 130 to local control functions; (iii) Improved security. The improved security results from less data being sent to the cloud computing system 112. In addition, rather than having security endpoints on each low power sensor node such as first sensor device 140, as is the case in the architecture 100 of FIG. 1A, the security endpoint is at the edge processing function 130.

In all of scenarios (i)-(iii) above, the need for backend server 110 and cloud computing system 112 remains. In a simple example, based on FIG. 1B, the edge processing function 130 stores the last hour's worth of data from first sensor device 140, second sensor device 144 and third sensor device 148, each of which might publish a temperature reading every minute. Only when any individual temperature reading exceeds a given threshold would all of the last hour's data from all of first sensor device 140, second sensor device 144 and third sensor device 148 be uploaded to the cloud computing system 112 and backend server 110 for processing.

One limitation in edge computing system 150 of FIG. 1B remains the reliability of backhaul link 120, even given the autonomous nature of some processing carried out in edge processing function 130.

SUMMARY OF THE INVENTION

In accordance with a first aspect of the invention, an edge computing system in accordance with claim 1 is provided. In accordance with a second aspect of the invention, an edge processing function in accordance with claim 6 is provided. In accordance with a third aspect of the invention, an edge computing system in accordance with claim 7 is provided. The dependent claims provide further details of embodiments.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention.

DETAILED DESCRIPTION

Example embodiments of the present invention are described below.

Figure 1B:
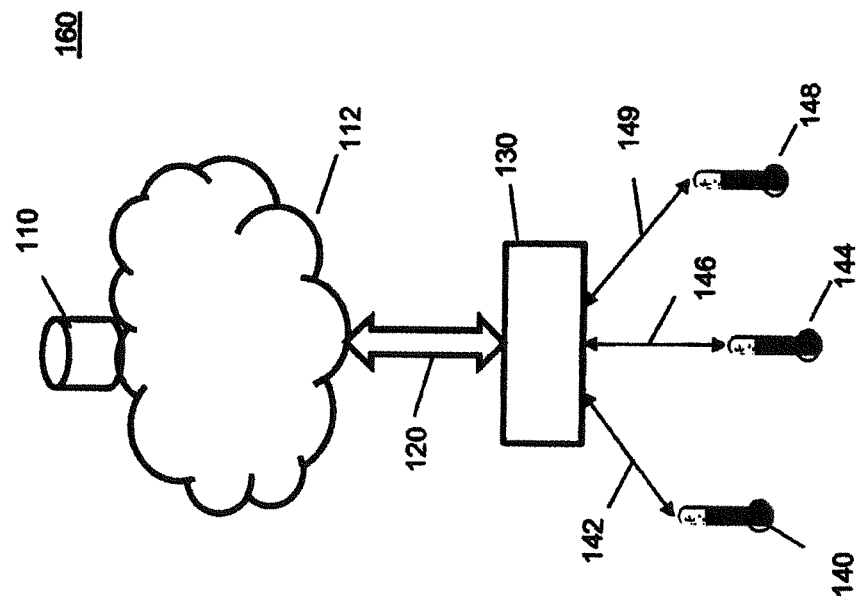
FIG. 1B shows an example of a known edge computing architecture 160 in schematic form.
Figure 1A:
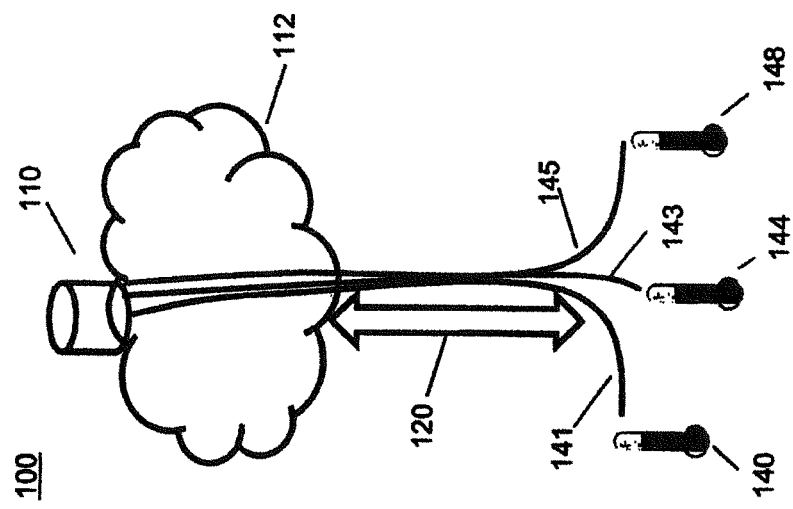
FIG. 1A shows an example of a known cloud computing architecture 100 in schematic form.

When designing functionality, such as for the known edge processing function 130 of FIG. 1B, separate development is normally required to construct the functionality that will reside at the edge processing function 130 and in backend server 110 of cloud computing system 112. In particular, a predefined interface is specified between these two functions. The interface may be an API, i.e. an Application Programming Interface. In known systems, the interface ensures that edge processing function 130 and cloud computing system 112 can talk to each other effectively. Typically, software designers will first of all decide on a bespoke interface design for the interface between edge processing function 130 and cloud computing system 112. That design might depend on a 'worst-case' scenario of the bandwidth of connection 120. Once the bespoke interface design has been frozen, typically, separate development groups will then have to develop the edge and network side of the functionality within the constraints set by the chosen interface.

The designers of an interface between edge processing function 130 and cloud computing system 112 of FIG. 1B thus make fixed, a priori assumptions about the bandwidth available and/or the latency in connection 120, i.e. in the backhaul link between cloud computing system 112 and edge processing function 130. These assumptions then determine a split of functionality that the designers will implement between edge processing function 130 and cloud computing system 112. In the example of FIG. 1B, if it is assumed that the bandwidth in the connection 120 is high, a scheme might be implemented as discussed previously, whereby once a temperature threshold is crossed the whole of, for example, an hour's data from first sensor device 140, second sensor device 144 and third sensor device 148 is transported back to cloud computing system 112. Alternatively, when the assumption about the bandwidth available in connection 120 is that that bandwidth is deemed to be low, then the designers might arrange the interface such that, once the threshold is reached, only a processed version of the hour's data is sent to the cloud computing system 112. For example, a distribution function may be calculated in edge processing function 130 based on the ensemble of data over a time period. Then raw versions of only those data which are outliers may be provided to cloud computing system 112 via connection 120.

Typically backhaul connections such as connection 120 have capacity which is difficult to predict and may vary considerably over time. This leads to the a priori assumptions in known systems, which then guide the designers of the edge and cloud-side elements to design specific functionality for the edge and cloud elements.

In contrast to the situation in FIG. 1B, the present invention starts from realizing the limitations of such known approaches. The invention addresses situations that may arise in which a priori assumptions about the backhaul connections are wrong or at best inefficient. In such situations, without the invention, there may be congestion in connection 120 when sending back data to cloud computing system 112. Alternatively, unnecessarily large processing may be conducted at the edge processing function 130, and some useful data is then not used in the overall processing, including that in backend server 110. A similar argument can be made regarding latency in the backhaul, which leads in known systems to similar non-optimal processing.

Figure 2:
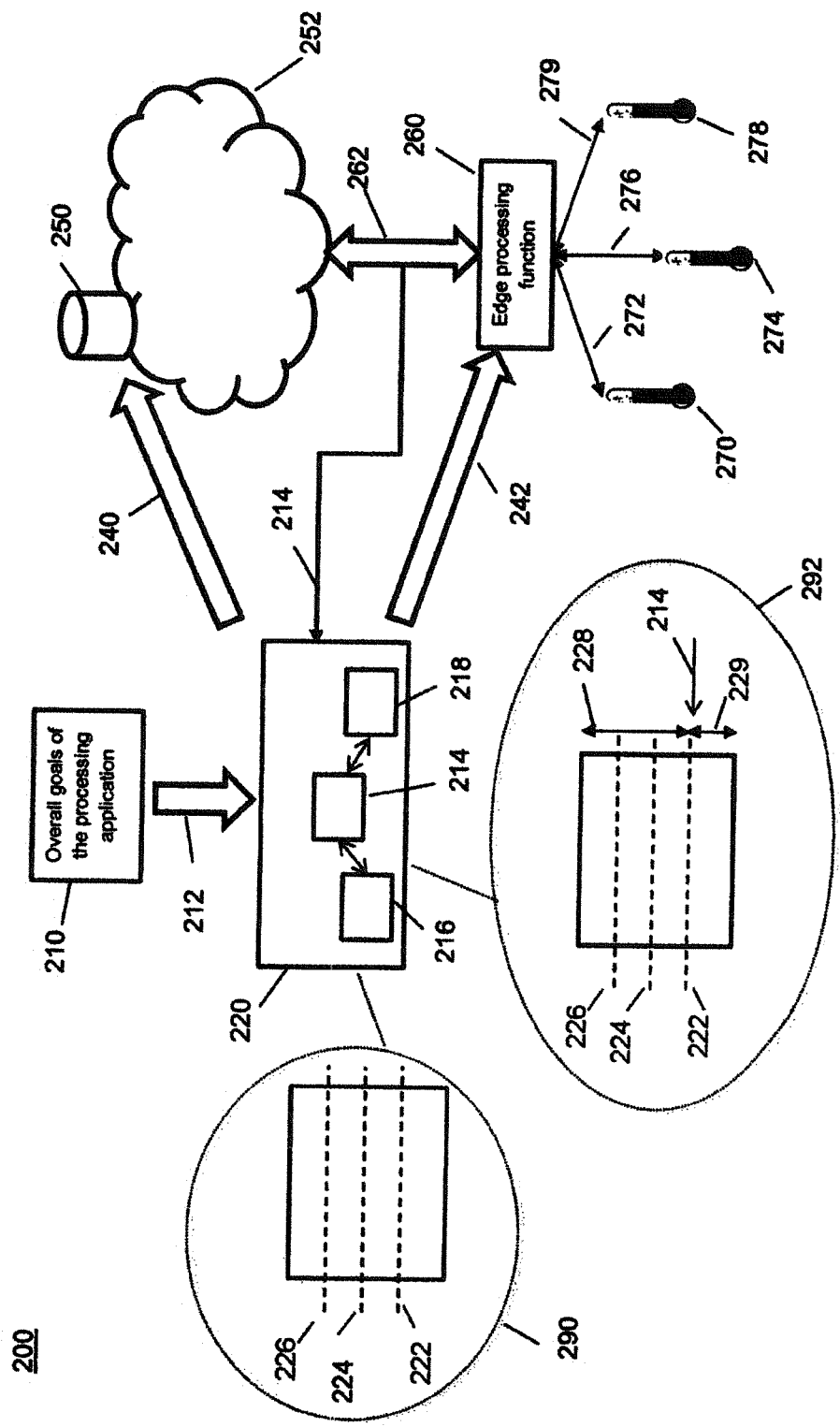
FIG. 2 illustrates an edge computing system, in accordance with an embodiment of the present invention.

A first embodiment of the invention is generally as illustrated in FIG. 2. FIG. 2 illustrates an edge computing system 200, in accordance with an embodiment of the present invention. Backend server 250 forms part of cloud computing system 252.

Edge processing function 260 links to cloud computing system 252 via connection 262. Edge processing function 260 links to first sensor device 270 via first connection 272, to second sensor device 274 via second connection 276, and to third sensor device 278 via third connection 279.

Edge processing function 260 may, for example, be implemented in an edge server, or another module provided with a processor, such as a digital signal processor (DSP). Although henceforth referred to with the general term 'edge processing function' 260, a hardware implementation of circuitry to achieve the required functionality is intended, and a detailed hardware implementation is described in connection with FIG. 8. Where edge processing function 260 is a wireless device, the available battery power to edge processing function 260 may be an issue. In particular, an assessment of a battery cost of sending data over the backhaul link, i.e. connection 262, and/or a battery cost of performing processing at edge processing functionality 260, may be utilised in the present invention.

At data input module 210, the overall goals of the processing are set out. Examples of these are given below. Arrow 212 indicates that these overall goals are provided as an input to an assessment module 220. Arrow 214 indicates that a second input is provided to assessment module 220 by a measurement of connection 262, i.e. the backhaul link as it is measured empirically. Assessment module 220 comprises a processor 214, memory 216 and a communication processor 218. Communication processor 218 receives inputs 212 and 214, and communicates outputs from assessment module 220 as described below.

Assessment module 220 carries out two specific actions. The first action is to determine interfaces, each with a corresponding split of functionality between backend server 250 and edge processing function 260. The second, subsequent action is to supply a suitable interface and a corresponding split of functionality to a backend server 250 and an edge processing function 260, after assessment module 220 has received information about communication conditions between the backend server 250 and the specific edge processing function 260.

The interfaces that are developed within assessment module 220 are illustrated in processing stack 290 of FIG. 2, which is illustrated separately from assessment module 220 for clarity of illustration. Processing stack 290 is illustrated as having multiple interfaces, i.e. first interface 222, second interface 224 and third interface 226. Each interface has a corresponding division of functionality between the backend server 250 and edge processing function 260. The higher in processing stack 290 the interface is shown, then: (i) the more processing is required at the edge processing function 260 when that interface is used; and (ii) the smaller the bandwidth required on connection 262, i.e. the backhaul link, or the greater the tolerance to latency delay, when that interface is used.

A subsequent stage of operation is shown in processing stack 292. In processing stack 292, arrow 214 illustrates again the second input to assessment module 220 that is provided by a measurement of connection 262. In the exemplary illustration of processing stack 292, arrow 214 points to first interface 222, which is the lowest interface in processing stack 292. Based on the overall goals 210 of the processing and the measurement shown by arrow 214, first interface 222 will be provided to backend server 250 and edge processing function 260, together with a corresponding specification of processing to be carried out by each of backend server 250 and edge processing function 260. Arrow 240 indicates communication of the definition of first interface 222 to backend server 250, together with a definition of the processing that backend server 250 is to carry out in order to meet overall goals 210. Arrow 242 indicates communication of the definition of first interface 222 to edge processing function 260, together with a definition of the processing that edge processing function 260 is to carry out in order to meet overall goals 210.

If the measurement 214 comprised different values, then the interface supplied to each of backend server 250 and edge processing function 260 might not be first interface 222. Second interface 224 and the corresponding functionality, or third interface 226 and the corresponding functionality, might instead be appropriate.

Thus assessment module 220 serves to automatically derive, and then deliver, a partition of functions between backend server 250 of cloud computing system 252 and edge processing function 260. The delivery indicated by arrows 240 and 242 is based on actual measurement 214 of the backhaul capacity and/or latency of connection 262.

In a further enhancement, other cost functions may be incorporated as part of the decision process, such as the power requirement for processing in edge processing function 260 and/or for communication over connection 262. Where edge processing function 260 exists in a mobile device, battery demands on the mobile device may be a constraint that is used, in addition to or in some instances instead of the measurements of the backhaul capacity and/or latency of connection 262. The total list of factors that assessment module 220 is configured to utilize, if available, comprises the following: (i) Backhaul bandwidth; (ii) Backhaul latency; (iii) Storage capability at the edge processing functionality 260; (iv) Processing capability at edge processing functionality 260; (v) Battery cost of sending data over the backhaul link, i.e. connection 262; (vi) Battery cost of performing processing at edge processing functionality 260. Each of these would be weighted, if available, but would determine the functional split that would be chosen.

The invention thus provides a tool to develop interfaces, such as first interface 222, second interface 224 and third interface 226. These are interfaces, and corresponding functionality splits, which take the input from step 210 and provide solutions that meet the overall goals of the processing function. The work of assessment module 220 is illustrated below with a numerical example. In the example, we can consider a large number of temperature sensors associated with a manufacturing process. The temperature sensors produce readings every 2 seconds. An overall goal specified in step 210 is to shut down production when both of the following two conditions are met: (i) At least two sensors show a temperature greater than 20 degrees within a 30 second period; and (ii) The 95th percentile of the distribution of all data collected over a one week period is greater than 10 degrees. These are inputs into assessment module 220, which constitutes a software tool that defines the overall functionality that the combined edge/cloud function must achieve. The table below shows examples of the possible functional splits that the software tool may produce for the numerical conditions (i) and (ii) above. The functional splits in the table also define the structure of the interface between cloud and edge.

As an example, the split in the first row of the table is appropriate if the battery cost of using the backhaul is high but the battery cost of edge processing is low. This split would also be appropriate for the case of low backhaul bandwidth and high latency. In this case processing at edge processing function 260 is appropriate. Row 1 is thus one possible interface and corresponding optimum split of functionality between edge processing function 260 and backend server 250 with all the processing being implemented in first edge processing function 260. In this case, the interface would allow for information to pass back to backend server 250. The processed data sent to the server 250 would be, for example, a simple indication to the cloud that the alarm condition has fired. Server 250 would then not have the data on which to perform some form off line analytics later. The alarm condition might be sent directly to a local function rather than the cloud which would totally remove cloud functionality.

Notably, the backend server 250 would still have inbuilt processing capability, which might be used for example with other edge processing functions. The inbuilt processing capability of the backend server 250 might also be used subsequently, after a change is made to the design of edge processing function 260 or to the sensors or the process that the sensors monitor, at which point a new cycle of design of the interface and split of functionality between edge processing function 260 and backend server 250 should be made.

TABLE 1

Illustrative example of operation of assessment module

| Possible functional split | Detail of operation | Comment |
|---|---|---|
| 1. Do all processing at the edge processing function 260. | The interface between the edge processing function 260 and backend server 250 is just a simple binary trigger, based on whether the condition to shut down production has or has not occurred. | The advantage of this split is that the backhaul bandwidth requirements are low. However significant storage capability is required at edge processing function 260, i.e. a whole week's data needs to be stored. Also, by not sending any data to backend server 250, the chance to perform offline analytics on the data to find other issues is lost. |
| 2. Store 30 s worth of data at the edge processing function 260 and perform test for condition (i); also calculate the distribution of the 30 s data and send an indication of this distribution to the core. | The core then uses the 30 s distribution to create a 1 week distribution, and thus can determine if condition (ii) occurs. The core is informed of trigger for condition (i) directly. The interface is then defined as binary trigger for condition (i), and an indication of the distribution for a 30 s period. | The advantage of this is that the edge processor can quickly determine condition (i) and the processed 30 s data requires a relatively small backhaul bandwidth. The edge processor requires a relatively small data storage. However, only a limited amount of offline analytics can be performed on the data, because of the processing at the edge processing function 260. |
| 3. Store 30 s worth of data at the edge processing function 260 and perform test for condition (i); also send the 30 s worth of data unprocessed to the backend server 250. | The interface is then defined as binary trigger for condition (i) and a set of 30 s worth of raw data. | The advantage of this is that the edge processing function 260 can quickly determine condition (i). By packing up 30 s worth of data, it is likely to be possible to reduce the required bandwidth on connection 262, even though raw data is being transmitted. However bandwidth requirements on connection 262 are high. |
| 4. The edge processing function 260 sends raw data to the backend server 250. No functionality is required of edge processing function 260. | | |

As shown in table 1 above, the software development tool has generated multiple interface and corresponding functionality splits. Solutions such as those shown in table 1 are set up in processing stack 290 in advance. The example of table 1 illustrates the 'automatic' nature of the invention.

The subsequent step performed by assessment module 220 is to compare the measurement indicated by arrow 214 with the multiple interfaces and corresponding functionality splits. The measurement may include, for example, bandwidth and latency, plus the available processing and storage capability of the edge processing functionality 260.

There may be multiple edge processing functionalities 260 at different locations throughout edge computing system 200. In this case, the multiple edge processing functionalities 260 may therefore be suited to different partitions, even when working with the same backend server 250. The example of table 1 illustrates the 'automatic' nature of the invention.

Thus the partitioning of functions may be implemented by having multiple designs of interface available, in advance, before any selection needs to be made of which interface is to be provided to one or more edge processing functions 130. Based on actual measurements 214 of the backhaul capacity and/or latency of connection 120, a selection is then made of which interface is to be provided to edge processing function 130 to run the backhaul communication over connection 120. Corresponding functionality is provided in backend server 250 to work with the particular interface that has been provided to edge processing function 130 to run the backhaul communication over connection 120 to backend server 250.

The invention is thus to have a single definition of the overall processing problem and a function which automatically partitions functionality. The single definition of the overall processing problem ensures that the overall software design, which encompasses both cloud and edge processing, is based on a single set of goals.

In another simplified example of temperature sensing, we may have temperature sensors in a factory process. That process may have to be halted for a period of time, if the first sensor device 140, second sensor device 144 and/or third sensor device 148 detect particular temperature values. The invention may aim, for example, to analyse the state of all temperature readings, to test for a potential production problem when any one of the temperature sensors exceed a given threshold. However, there is also a proviso that the data must be analysed in a very short period of time after the threshold has been exceeded, say less than 10ms. If a static version of the interface were to be defined, as with the known system of FIG. 1B, then a design decision would need to be taken at the outset on the appropriate split in functionality between cloud and edge processing, based on an off line estimate of the latency and bandwidth of the connection 120, i.e. the backhaul link. In the known system of FIG. 1B, the software designers might typically assume that the worst case latency and/or bandwidth in the connection 120 is poor, so that the functionality in the edge is to monitor the temperature readings and when the threshold is exceeded a highly processed set of data (say the mean and standard deviation of all the temperature readings) should be passed up to the cloud for processing. In the backend server 110 of FIG. 1B, a model of the production process checks if this communicated data is indicative of an acceptable process. Because the cloud functionality of FIG. 1B has to work on a highly processed set of data, the decision whether there is a problem isn't as accurate, so a more conservative production process has to be maintained, with the production line frequently shut down.

With the invention, without reliance on the assumptions of known systems, then, for example, the processing at the edge may need to be less intensive. In the example discussed above, with the invention, raw measurements for the highest readings from 10 sensors plus the mean and standard deviation may then be provided to the cloud processor in the available time. The result is better overall functionality. In the case of first sensor device 140, second sensor device 144 and/or third sensor device 148 detecting particular temperature values of an industrial process, the result would be that the production line is shut down less frequently.

There may be other factors besides bandwidth and latency of connection 120 that are measured and fed to the decision methodology, and which thus affect the resulting design. For instance, it may require large amounts of power to send data over the backhaul link and the edge processor may have only limited battery capabilities.

In the method of a first embodiment of the present invention, there may be multiple pre-stored interfaces. The method adaptively chooses which level of interface to supply to the edge and cloud processing elements, to run over the backhaul such as connection 120.

The embodiment of FIG. 2 shows a single edge processing function 260. Where multiple edge processing functions 260 are to work with backend server 250, each edge processing function 260 may be provided with an interface that is based on the bandwidth and/or latency of the connection 262 that is available between that particular edge processing function 260 and cloud computing system 252.

The measurement of the connection 120 may be a single, one-time measurement. However, the measurement may itself comprise or be derived from multiple sub-elements of the measurement, with the sub-elements comprising at least one of latency and bandwidth. The measurement may be derived from an 'active sounding'. For example, sounding data is sent from cloud computing system 252 to edge processing function 260 and/or vice versa. The sounding data may then be used to determine both latency and bandwidth. Alternatively, the measurement may be a direct measurement of one or more physical layer parameters, e.g. the modulation and coding scheme employed in LTE or 802.11 WiFi. The processing functionality for edge processing function 260 and backend server 250 are chosen together with the interface that is to be used. As a consequence, this choice may not fully utilize the processing capability that is available in one or both of edge processing function 260 and backend server 250. However, a different measurement of the connection 120, for example at a different time, may lead to an interface and split of processing functions between edge processing function 260 and backend server 250 that fully utilizes the maximum available processing capacity in one or both of edge processing function 260 and backend server 250. In effect, a software development tool may allow the automated design of, and/or the selection of one of, first interface 222, second interface 224 and third interface 226 with an optimised split of functionality.

Figure 3:
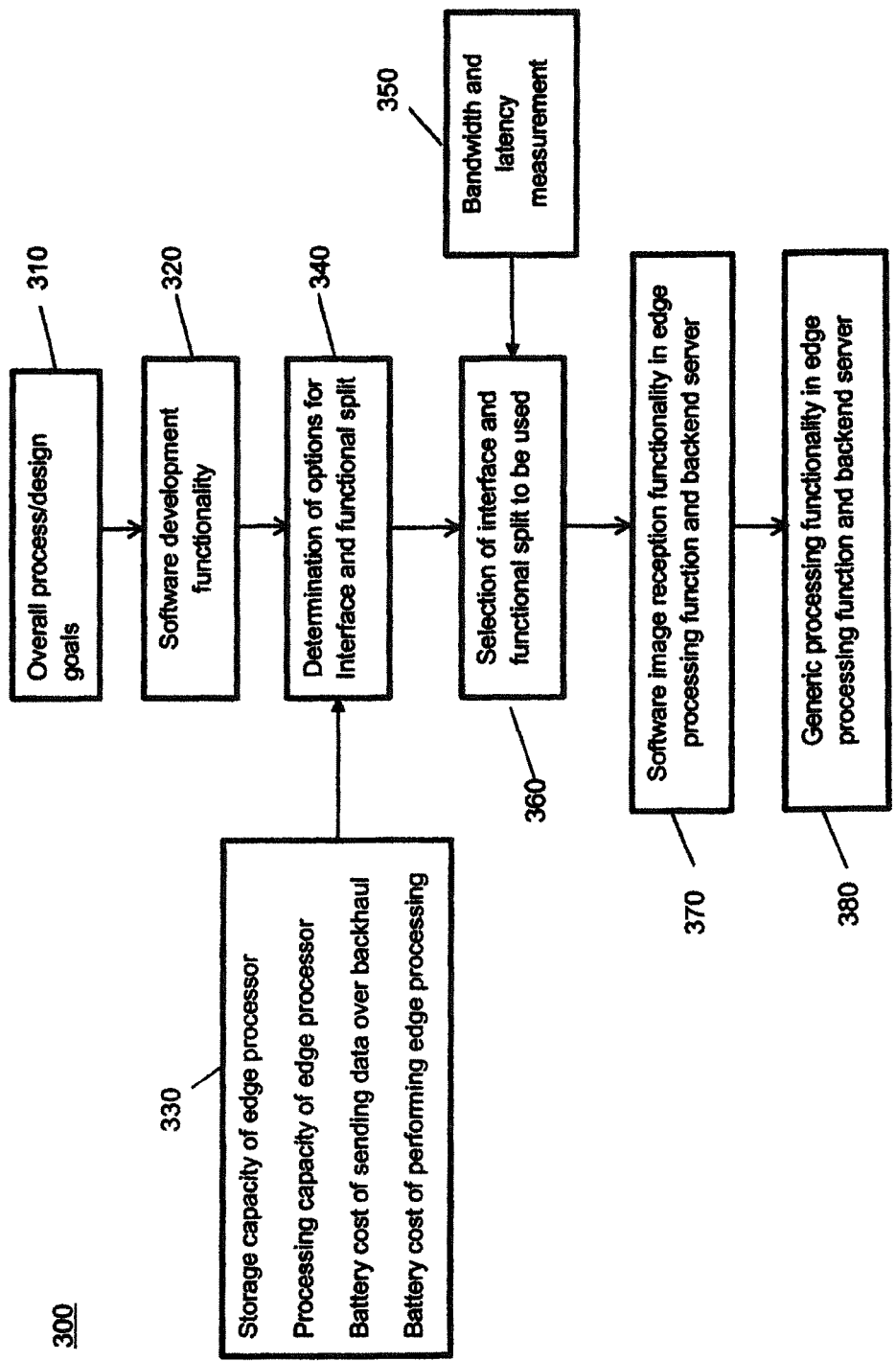
FIG. 3 provides a high level overview of the functions of the interacting parts of the edge computing system of FIG. 2.

FIG. 3 provides a high level overview of the functions of the interacting parts of the edge computing system 200 of FIG. 2. The functions in FIG. 3 are illustrated by being linked in FIG. 3 in the temporal sequence in which they occur.

At step 310, the overall process and design goals are set up, as shown at 210 in FIG. 2. The overall process and design goals are supplied to the software development functionality of assessment module 220 at step 320.

At step 330, various input information is fed into the method 300. The parameters supplied at step 330 are some or all of (i) Storage capacity of edge processor; (ii) Processing capacity of edge processor; (iii) Battery cost of sending data over backhaul; and (iv) Battery cost of performing edge processing. As more comprehensive list of parameters can be used at step 330 when other information is available about the design of either connection 262 or one or more of edge processing functionality 260 or backhaul server 250. For example, when the backhaul bandwidth and backhaul latency are known, they can also be used in step 330.

At step 340, a set of options for interface design, with corresponding functionality splits, is created. Software development functionality 320 derives the first interface 222, second interface 224 and third interface 226, as shown at 290 in FIG. 2. Software development functionality 320 derives an optimised split of functionality that will work with each of first interface 222, second interface 224 and third interface 226, i.e. that would be applied between edge processing function 260 and backend server 250 if the particular interface were applied. The options might, instead, be the four options in table 1 above.

The bandwidth and latency measurement 350 provides input information to method 300, concerning the bandwidth and/or latency in the connection 262. Based on the measurement, at step 360 the software development functionality 320 is then able to choose one of the first interface 222, second interface 224 or third interface 226, and send it to the software image reception functionality 370.

Software image reception functionality 370 in each of backend server 250 and edge processing function 260 receives the software image from the development tool and installs it at step 380 in edge processing function 260 and backend server 250. The generic processing functionality in each of edge processing function 260 and backend server 250 runs the software image, i.e. the chosen interface and appropriate supporting processing tasks.

Figure 4:
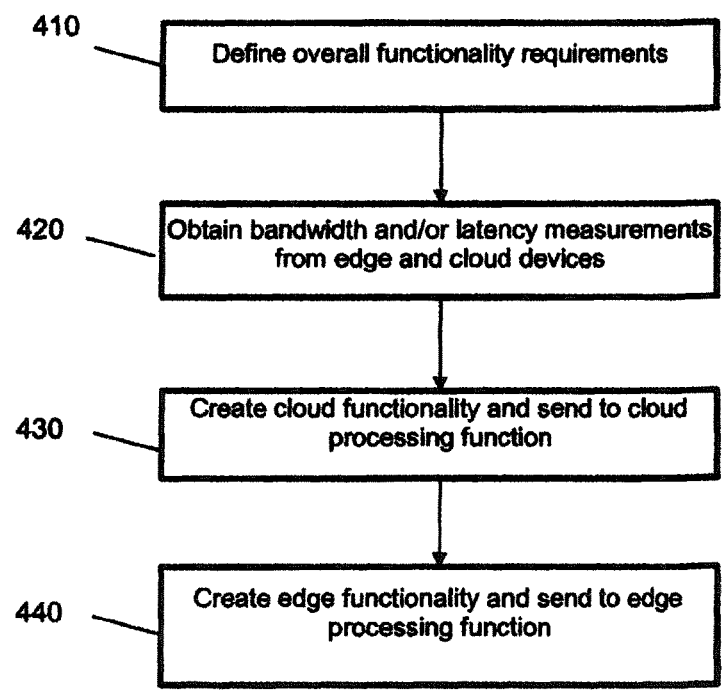
FIG. 4 provides more specific detail of the software development functionality of FIG. 3.

FIG. 4 is a flowchart that illustrates, at a high level, the steps of the method used to derive and distribute the first interface 222, second interface 224 or third interface 226. Thus FIG. 4 provides more specific detail of the software development functionality utilized at steps 320 and 330 in FIG. 3.

At step 410, the overall functionality that must be delivered by the edge processing function 260 and backend server 250 is derived. This decision is based on the overall goals in box 210 of FIG. 2. A further input to the decision is obtained in step 420, where the measurement 214 from connection 262 is obtained. In step 430, the cloud functionality to be implemented in backend server 250 is created and sent to backend server 250. In step 430, the edge functionality to be implemented in edge processing function 260 is created and sent to edge processing function 260.

In FIG. 4, the order of steps 410 and 420 could be reversed, or both of steps 410 and 420 could be implemented in parallel. Likewise, the order of steps 430 and 440 could be reversed, or both of steps 430 and 440 could be implemented in parallel.

Figure 5:
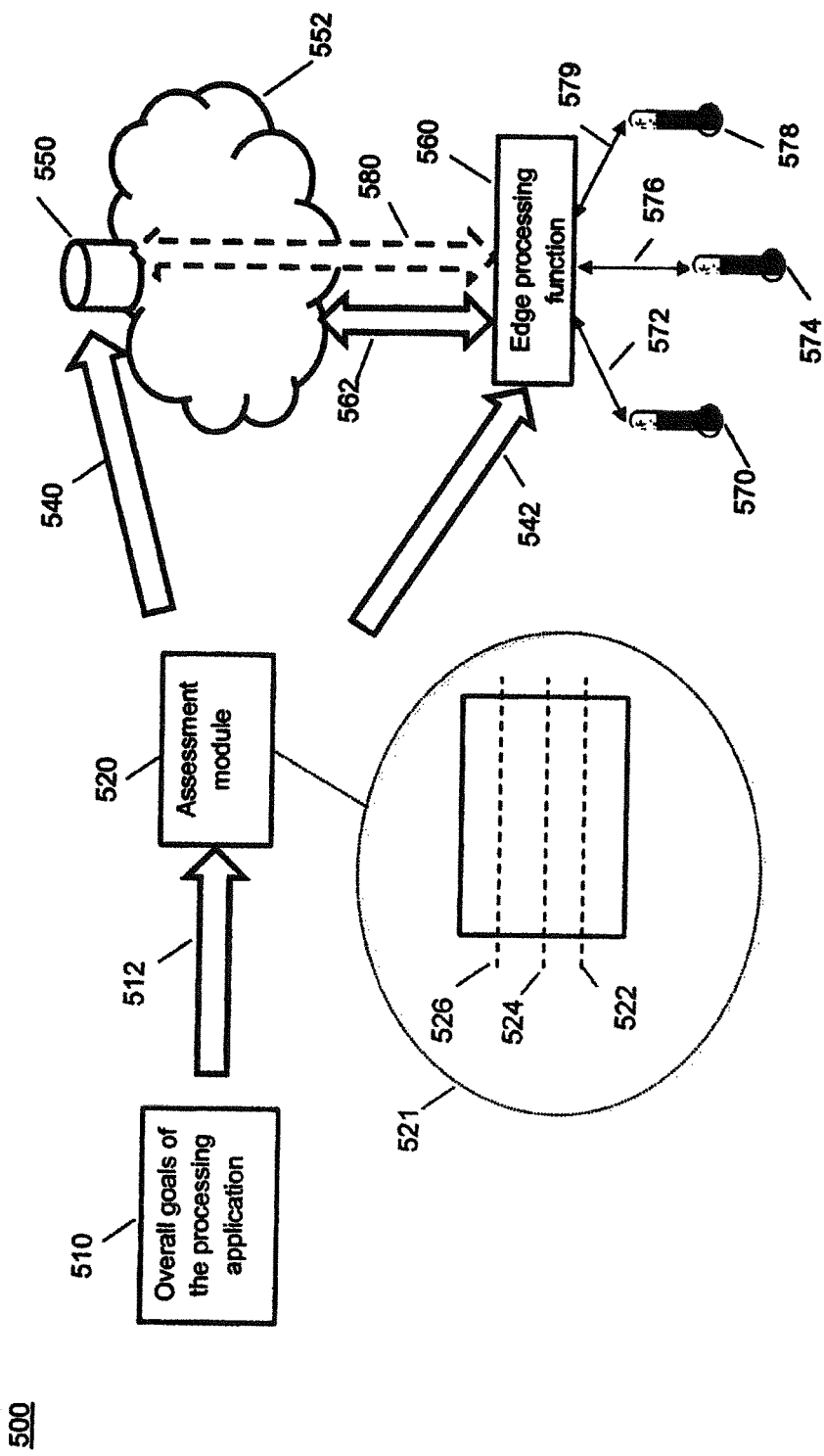
FIG. 5 illustrates an edge computing system 500, in accordance with another embodiment of the present invention.

FIG. 5 illustrates an edge computing system 500, in accordance with another embodiment of the present invention. The overall goals of the processing to be achieved are shown at 510, and are fed to assessment unit 520. Assessment unit 520 creates processing stack 521. Within processing stack 521 are first interface 522, second interface 524 and third interface 526.

The edge computing system 500 further comprises cloud computing system 552, connection 562, backend server 550 and edge processing function 560. Arrow 540 indicates download from processing stack 521 to backend server 550. Arrow 542 indicates download from processing stack 521 to edge processing function 560. The whole of the processing functionality, including all of the possible interfaces and functionality splits in processing stack 521, can be downloaded to both edge processing function 560 and backend server 550.

With edge computing system 500, the functionality required to meet the overall processing goals is downloaded in its entirety to both the edge processing function 560 and the backend server 550. During subsequent operation of the edge computing system 500, the edge processing function 560 and the backend server 550 then adaptively choose the interface level and the appropriate functionality that each must perform. Dashed arrow 280 indicates the communication and decision made between edge processing function 560 and backend server 550. Those choices are made in dependence on a measurement of conditions in the connection between the edge processing function and cloud computing system. Hence the split of functionality between the edge and cloud devices, and the selection of the appropriate interface between the devices, are variable at different times in dependence on prevailing conditions in the backhaul connection.

The edge computing system 500 of FIG. 5 differs from the edge computing system 200 of FIG. 2 in two aspects. The first difference concerns the download to edge processing function 560 and backend server 550. At least two interfaces and corresponding splits of functionality are downloaded from the processing stack 521 to each of edge processing function 560 and backend server 550. Arrow 540 indicates download from processing stack 521 to backend server 550. Arrow 542 indicates download from processing stack 221 to edge processing function 260. In a more general case, the whole of the processing functionality, including all of the possible splits, can be downloaded to both edge processing function 560 and backend server 550. After downloading the whole of the functional stack with all splits/interfaces to each of edge processing function 560 and backend server 550, edge processing function 560 and backend server 550 then determine the split between themselves, which may be a partly off line function.

The second difference concerns decisions that will be made between edge processing function 560 and backend server 550, after they have received the at least two interfaces and corresponding splits of functionality from the processing stack 521. Dashed arrow 280 indicates the communication between edge processing function 560 and backend server 550, and edge processing function 560 and backend server 550 can therefore decide, adaptively, which interface level is to be used. The decision can be based on a realtime measurement of connection 262. That measurement can correspond to a real-time, ongoing measurement of the same variables as were measured to provide measurement 214 in FIG. 2.

Arrow 214 is not shown in FIG. 5, because the measurement is not used to derive first interface 522, second interface 524 and third interface 526 in assessment module 520. Assessment module 520 simply determines possible interfaces and corresponding functionality for each interface. When two or more of first interface 522, second interface 524 and third interface 526 have been downloaded to edge processing function 560 and backend server 550, with the corresponding functionality, then one of the interfaces will be selected. However, subsequent measurements of connection 562 may indicate that a different interface would provide a more optimum operation, i.e. would better meet the overall goals 510 under prevailing conditions in connection 562. When that occurs, connection 580 allows a joint decision to be made by edge processing function 560 and backend server 550 to use a different interface.

One or both of edge processing function 560 and backend server 550 has measurement functionality to support the measurement of bandwidth and/or latency. Each of edge processing function 560 and backend server 550 has functionality to allow it to select a different interface and split of functionality than is currently being applied within it, by agreement between the edge processing function 560 and backend server 550.

Figure 6:
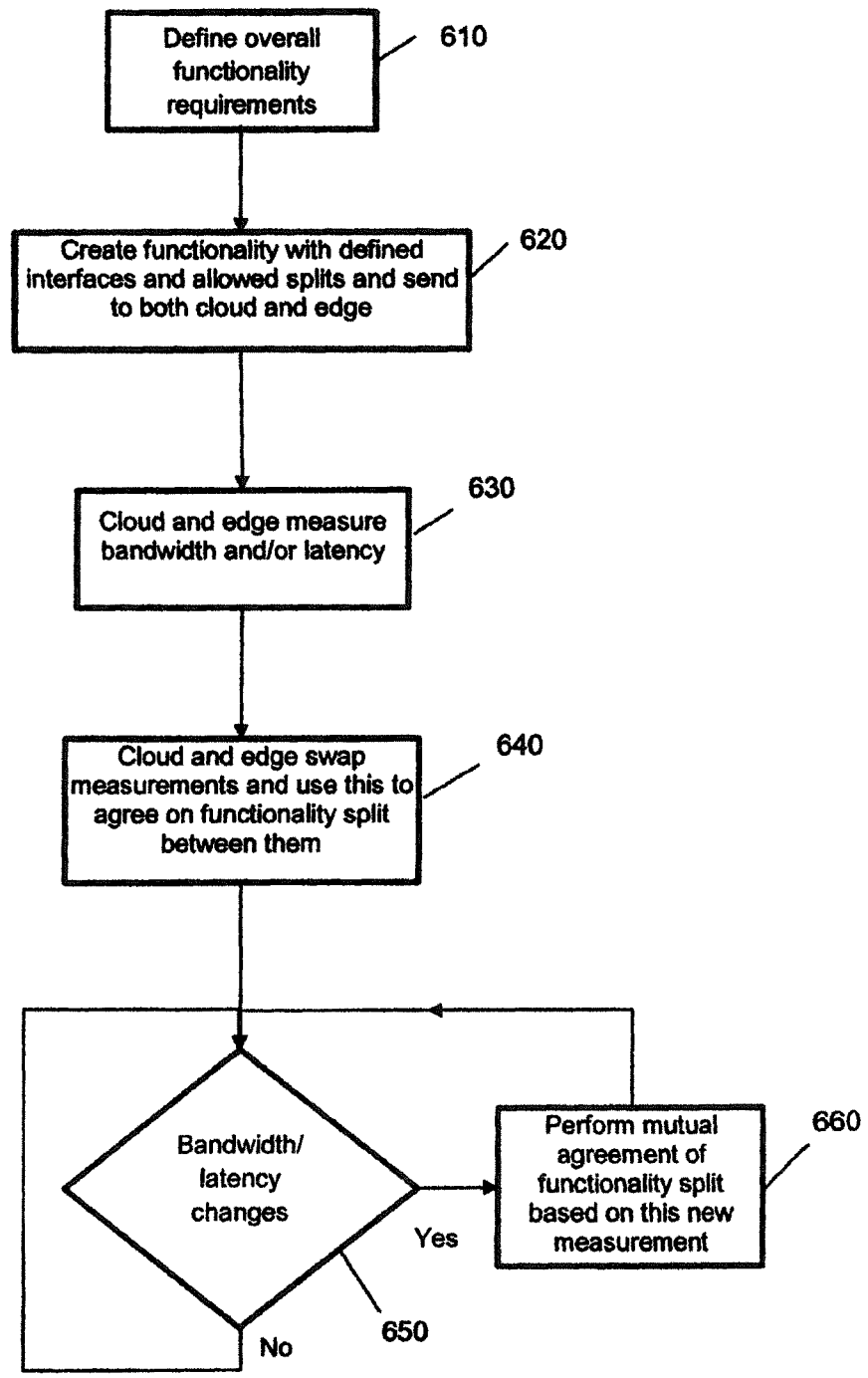
FIG. 6 is a flowchart that illustrates the steps of a method that can be used with the edge computing system of FIG. 5.

FIG. 6 is a flowchart that illustrates the steps of a method that can be used with edge computing system 500 of FIG. 5.

In step 610 the overall functional requirements are defined. This corresponds to step 410 in FIG. 4. In step 620, assessment module 520 creates the functionality. This functionality defines interfaces and corresponding splits of functionality between edge processing function 560 and backend server 550 that are to be sent to edge processing function 560 and backend server 550. The interfaces and corresponding splits of functionality between edge processing function 560 and backend server 550 then may later be selected by edge processing function 560 and backend server 550, as appropriate.

Subsequently, at step 630, edge processing function 560 and backend server 550 measure properties of the connection 562. The measurement may comprise bandwidth and/or latency.

At step 640, edge processing function 560 and backend server 550 jointly decide on an interface and the corresponding functionality split between them. If they are already in operation, they may decide either to maintain or to change the interface the corresponding functionality split that they are already using.

In step 650, a corresponding measurement to that in step 630 is made. If the bandwidth and/or latency have changed, for example by crossing a preset threshold, then the method moves to step 660. At step 660, the edge processing function 560 and backend server 550 jointly decide either to maintain or to change the interface that they are using, and the corresponding functionality split between them. If step 650 detects no change, or a change in latency and/or bandwidth below a threshold, then the method loops back to step 650 again.

In an alternative embodiment of the method of FIG. 6 and edge computing system 500 of FIG. 5, information concerning likely bandwidth and latency on connection 562 is used to create the functionality. Thus step 620 involves deriving interfaces and corresponding splits of functionality between edge processing function 560 and backend server 550 that are more likely to be optimized to bandwidth and/or latency that will be encountered by the edge computing system 500. The information concerning likely bandwidth and latency on connection 562 may be derived in a variety of ways. For example, it can be based on historical measurements, present values, or predictions based on likely load/activity levels in future.

Figure 7:
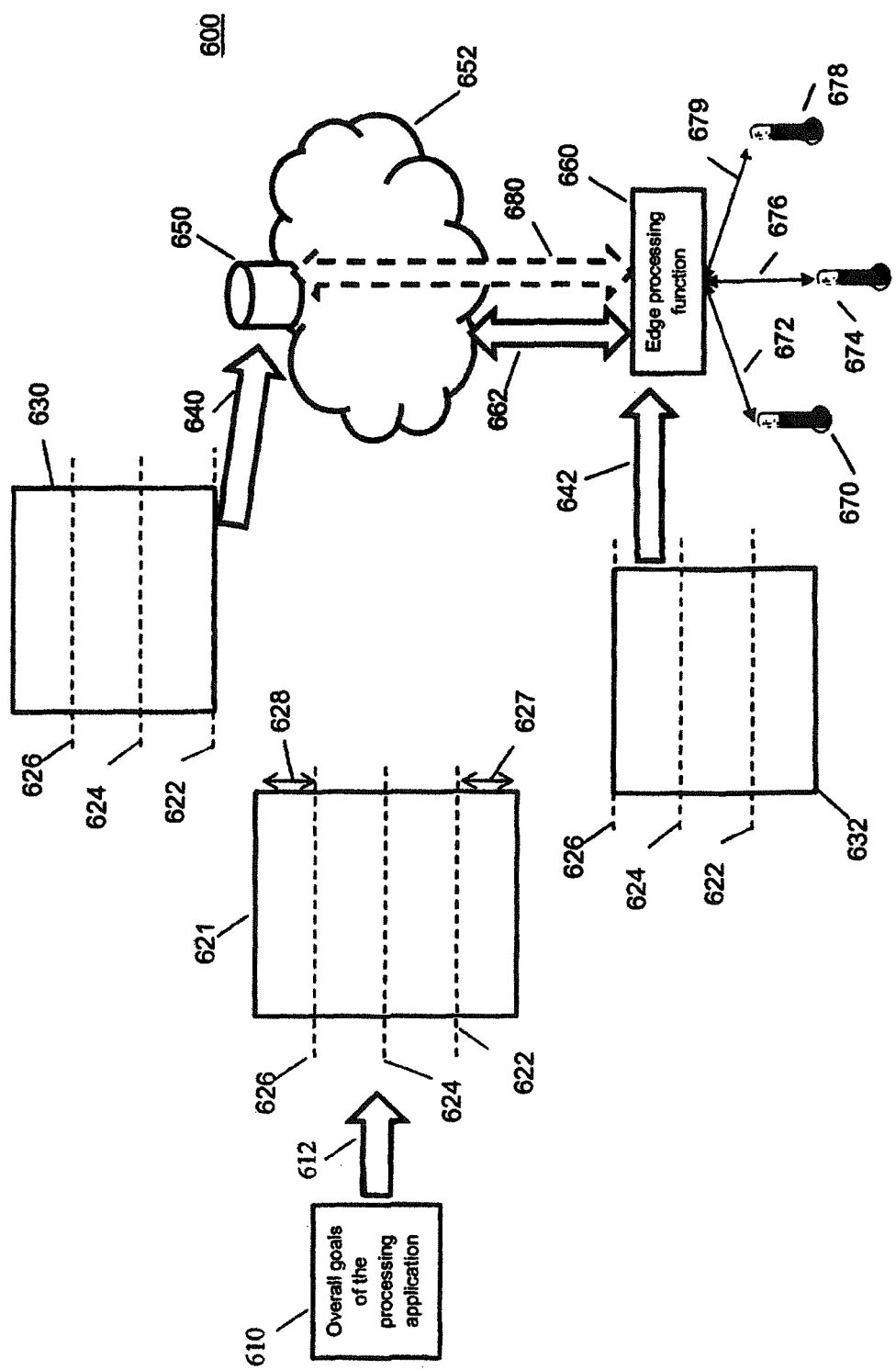
FIG. 7 illustrates an edge computing system 600, in accordance with another embodiment of the present invention.

FIG. 7 illustrates an edge computing system 600, in accordance with another embodiment of the present invention. Edge computing system 600 corresponds generally to edge computing system 500 of FIG. 5. However, the whole set of functionality of processing stack 621 is not downloaded. Instead, only parts of the functionality of processing stack 621 is downloaded, i.e. the parts which the edge and cloud functionality dynamically choose the appropriate split. In general terms, the top level functionality is deemed too intensive for the edge processing function and the backend cloud function is not to be provided with functionality for direct interfacing to measurement nodes.

In FIG. 7, the downloads indicated by arrows 640 and 642 do not include the whole set of functionality from processing stack 621. Instead, the downloads indicated by arrows 640 and 642 may be limited to those parts of the functionality between which the edge processing function 660 and backend server 650 will choose dynamically. So edge processing function 660 and backend server 650 store those parts of the functionality that they always use, and those parts of the functionality that they will use under certain conditions on connection 662 in dependence on the measurement of connection 662.

In FIG. 7, the backend server 650 is not provided with the lowest levels of processing functionality, for example processing functionality to allow backend server 650 to deal with the direct interfacing to measurement nodes such as first sensor device 670, second sensor device 674, and third sensor device 678. The lowest levels of functionality held in processing stack 621 are indicated by double-headed arrow 627. The levels of functionality in processing stack 621 that are indicated by double-headed arrow 627 are not sent to backend server 550. The subset of functionality of processing stack 621 that will be transmitted to backend server 650 is indicated on FIG. 7 by sub-stack 630 at the upper centre of FIG. 7. Sub-stack 630 lacks any functionality below level 622.

In FIG. 7, the edge processing function 560 is not be provided with the highest levels of processing functionality. The highest levels of functionality held in processing stack 621 are indicated by double-headed arrow 628. The levels of functionality in processing stack 621 that are indicated by double-headed arrow 628 are not sent to edge processing function 660. The subset of functionality of processing stack 621 that will be transmitted to edge processing function 660 is indicated on FIG. 7 by sub-stack 632 at the lower centre of FIG. 7. Sub-stack 632 lacks any functionality above level 626.

In the embodiment of FIG. 7, each of edge processing function 660 and backend server 650 will receive the processing functionality that assessment module considers that each will always need, plus the 'variable' functionality that each may choose to implement in dependence on the measurement of the connection 662. Dashed arrow 680 indicates once again a communication and decision made in real time between edge processing function 660 and backend server 650 about which parts of the selectable functionality to employ.

Figure 8:
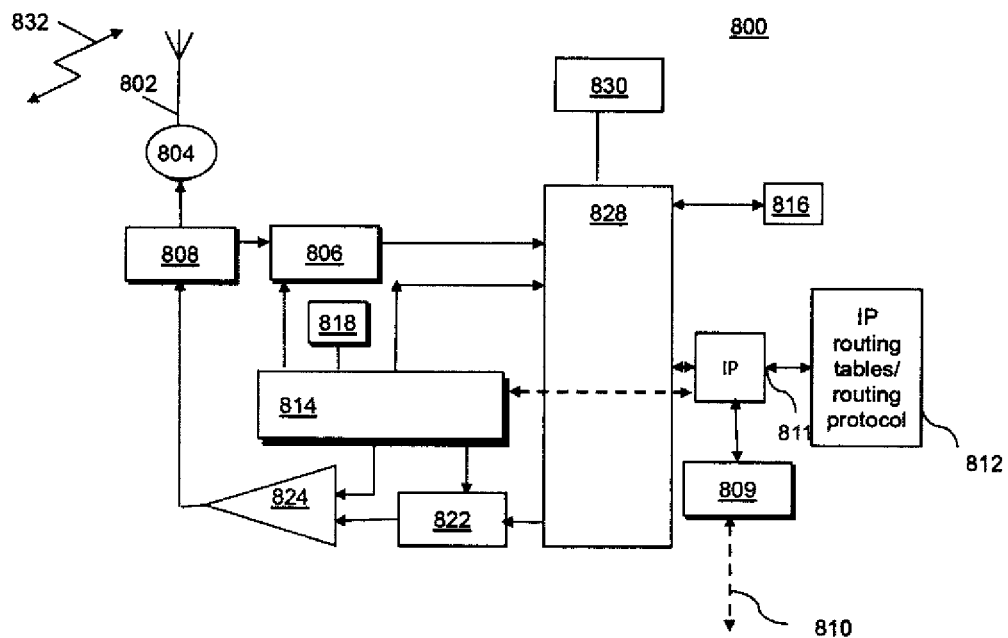
FIG. 8 illustrates one practical embodiment of an edge processing function that is wirelessly connected to sensors or other devices.

FIG. 8 illustrates one practical embodiment of an edge processing function that is wirelessly connected to sensors or other devices.

Referring now to FIG. 8, an example of edge processing function 800 as modified by the functionality herein described, is illustrated in accordance with some example embodiments of the present invention. In example embodiments of the invention the edge processing function 800 has been modified with the addition of functionality as described with reference to FIGS. 2-7. In practice, purely for the purposes of explaining embodiments of the invention, the edge processing function 800 is described in terms of both a wireless communication device and a wireline connected device, such as a computer, network server, laptop, etc.

In a wireless embodiment, the edge processing function 800 contains one or more antenna(e) 802 for communicating via various wireless technologies. In one example, the one or more antenna(e) 802 (coupled via a wireless interface 808 with associated transmit and receive circuitry) is configured to radiate and receive radiated signals 832, for example, on WiFi™ frequencies or bluetooth BT™ frequencies or cellular frequencies, e.g. LTE™ over a cellular network (not shown).

In a wireless example, the one or more antenna(e) 802 is coupled to an antenna switch or duplexer 804 that provides isolation between receive and transmit chains within the edge processing function 800, as well as providing isolation between circuits targeted for the specific technologies being supported, e.g. LTE™, WiFi™, BT™. One or more receiver chains, as known in the art, include receiver front-end circuitry 806 (effectively providing reception, filtering and intermediate or base-band frequency conversion). The receiver front-end circuitry 806 is coupled to a signal processor 828 (generally realized by a digital signal processor (DSP)). A battery 830 is provided. Although shown connected to processor 828, battery 830 may provide all power to edge processing function 800 in as wireless example.

A skilled artisan will appreciate that the level of integration of receiver circuits or components may be, in some instances, implementation-dependent. A controller 814 maintains overall operational control of the edge processing function 800. The controller 814 is also coupled to the receiver front-end circuitry 806 and the signal processor 828. A timer 818 is operably coupled to the controller 814 to control the timing of operations, e.g. transmission or reception of time-dependent signals, within the edge processing function 800.

In this example, controller 814 is connected to an internet protocol (IP) circuit/function 811, which is coupled to one or more IP routing tables and/or routing protocol software 812. In a wireline sense, the controller 814 may be operably coupled to other devices and nodes via a wireline interface 809 using a wireline connection 810, such as Ethernet.

A store 816 for processing functions is connected to signal processor 828. In some examples, the signal processor 828 of the edge processing function 800 may encompass much more functionality than the IP circuit/function 811 and IP routing tables and/or routing protocol software 812. In particular, in some examples, it is assumed that signal processor 828 may handle some or all higher layer functionality.

Thus, a method and apparatus for improving the reliability and performance of an edge computing system have been described, where the aforementioned disadvantages with prior art arrangements have been substantially alleviated.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

Furthermore, it is intended that boundaries between logic blocks are merely illustrative and that alternative embodiments may merge logic blocks or circuit elements or impose an alternate composition of functionality upon various logic blocks or circuit elements. It is further intended that the edge computing system and its elements depicted herein are merely exemplary, and that in fact many other edge computing systems and elements or architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. An edge computing system, comprising:
    a cloud computing system, a backend server within the cloud computing system, an edge processing function circuit, and a connection between the edge processing function circuit and the cloud computing system;
    an assessment module circuit, the assessment module circuit configured to:
        receive information about processing goals, and processing capabilities of the backend server and the edge processing function circuit;
        derive a set of possible application programming interfaces, APIs, and corresponding functionality splits, each functionality split defining a division of processing activity between the backend server and the edge processing function circuit;
        receive a measurement of bandwidth and/or of latency on the connection and the derived corresponding functionality splits;
        select an API and corresponding functionality split, based on the measurement; and
        download the selected API and corresponding functionality split to the edge processing function circuit and the backend server.

2. The edge computing system of claim 1, wherein:
    the information about processing capabilities of the edge processing function circuit comprises information about a storage capacity of the edge processing function circuit and a processing capacity of a processor of the edge processing function circuit.

3. The edge computing system of claim 1, further comprising the assessment module circuit receiving information about a battery cost of sending data over the connection, for a battery of the edge processing function circuit.

4. The edge computing system of claim 1, further comprising:
    the assessment module circuit receiving information about a battery cost of performing processing at the edge processing function circuit, for a battery of the edge processing function circuit.

5. The edge computing system of claim 1, wherein:
    the assessment module circuit further comprises a software development functionality for deriving the set of possible APIs and corresponding functionality splits; and
    a software image reception functionality circuit in the edge processing function circuit configured to receive the API and functionality for the edge processing function circuit; and
    a software image reception functionality circuit in the backend server configured to receive the API and functionality for the backend server.

6. An edge processing function circuit, the edge processing function circuit being linked by a connection to a cloud computing system, the edge processing function circuit configured to:
    receive a first API and a first functionality, the first API and first functionality appropriate to a first measurement of bandwidth and/or of latency on the connection;
    receive a second API and a second functionality, the second API and second functionality appropriate to a second measurement of bandwidth and/or of latency on the connection;
    deriving corresponding functionality splits between the received first and second APIs;
    receive a current measurement of bandwidth and/or of latency on the connection; and select, in dependence on the current measurement and the corresponding functionality splits, either:
the first received API and the first functionality; or
the second received API and the second functionality.

7. An edge computing system, comprising:
a cloud computing system, a backend server within the cloud computing system, an edge processing function circuit, and a connection between the edge processing function circuit and the cloud computing system;
an assessment module circuit, the assessment module circuit configured to:
create, appropriate to a first measurement of bandwidth and/or of latency on the connection, a first API,
create, corresponding to the first API, first functionality for the edge processing function circuit; and
create, appropriate to a second measurement of bandwidth and/or of latency on the connection, a second API,
create, corresponding to the second API, second functionality for the edge processing function circuit;
download the first and second created APIs to both the edge processing function circuit;
download, to the edge processing function circuit, the first and second functionality for the edge processing function circuit, corresponding to the first and second created downloaded APIs;
the edge processing function circuit being configured to:
(i) receive a current measurement of bandwidth and/or of latency on the connection; and
(ii) select the first or second created downloaded API and corresponding first and second functionality for the edge processing function circuit, in dependence on the measurement of bandwidth and/or of latency on the connection.

8. The edge computing system of claim 7, comprising:
the backend server being configured to:
(i) receive a current measurement of bandwidth and/or of latency on the connection; and
(ii) select the first or second created downloaded API and corresponding first and second functionality for the backend server, in dependence on the current measurement of bandwidth and/or of latency on the connection.

9. The edge computing system of claim 7, comprising:
the backend server and edge processing function circuit being configured to work together to select the first or second created downloaded API, in dependence on the current measurement of bandwidth and/or of latency on the connection.

10. The edge computing system of claim 9, comprising the backend server receiving the current measurement of bandwidth and/or of latency on the connection.

11. The edge computing system of claim 7, further comprising:
the assessment module circuit being configured to receive information about a battery cost of sending data over the connection, for a battery of the edge processing function circuit.

12. The edge computing system of claim 7, further comprising:
the assessment module circuit being configured to receive information about a battery cost of performing processing at the edge processing function circuit, for a battery of the edge processing function circuit.

13. The edge computing system of claim 7, wherein:
the assessment module circuit further comprises a software development functionality for deriving the first and second created downloaded APIs and corresponding functionality splits; and
a software image reception functionality circuit in the edge processing function circuit configured to receive the first and second created downloaded APIs and corresponding functionality splits for the edge processing function circuit; and
a software image reception functionality circuit in the backend server configured to receive the first and second created downloaded APIs and corresponding functionality splits for the backend server.

14. The edge computing system of claim 7, further comprising:
the assessment module circuit being configured to receive information concerning likely bandwidth and/or latency on the connection and using the information to derive APIs and corresponding splits of functionality between the edge processing function circuit and backend server.

15. The edge computing system of claim 14, wherein:
the information concerning likely bandwidth and latency on the connection is based on historical measurements, present values, and/or predictions based on likely load/activity levels in future.

\* \* \* \* \*